July 4, 1933.  W. S. LYNESS  1,916,930
PIPE COUPLING
Filed June 30, 1932
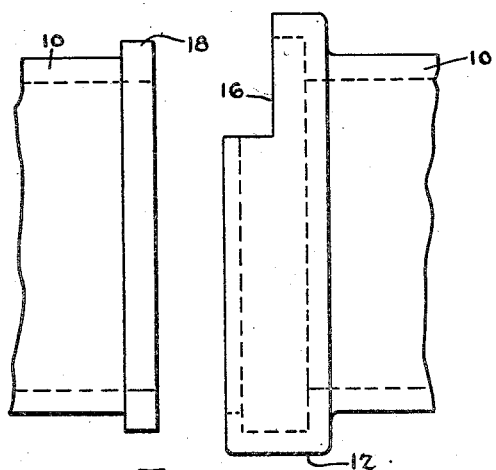
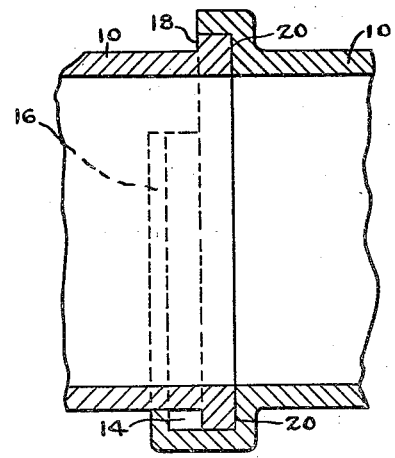
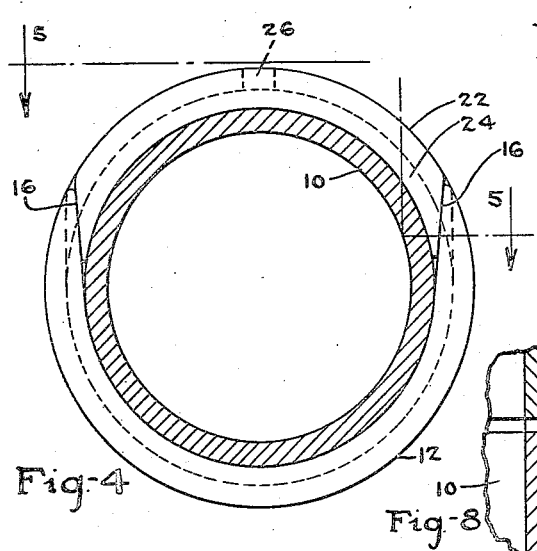
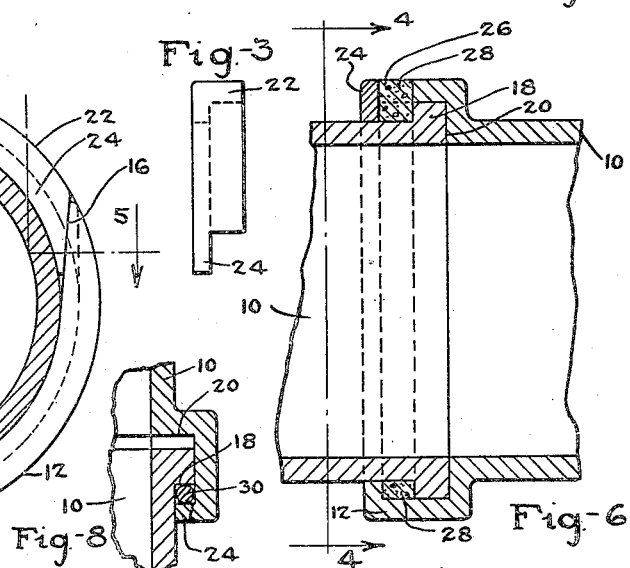
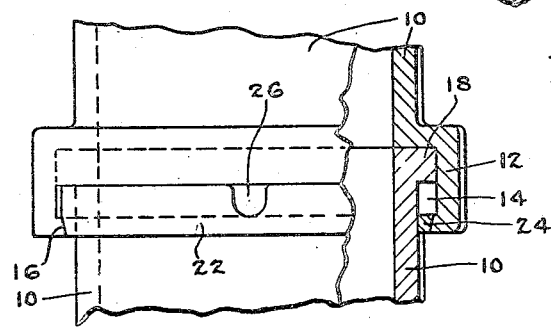
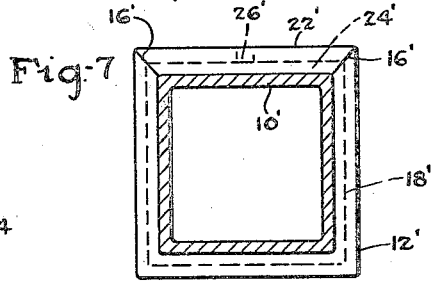
Inventor:
W. S. Lyness.
By Whiteley and Ruckman
Attorneys.

Patented July 4, 1933

1,916,930

UNITED STATES PATENT OFFICE

WILLIAM S. LYNESS, OF MINNEAPOLIS, MINNESOTA

PIPE COUPLING

Application filed June 30, 1932. Serial No. 620,081.

My invention relates to pipe couplings and is intended for securing together pipe sections for various uses such as sewer pipe, water pipe, gas pipe, drain pipe, irrigation pipe, steam pipe, conveying spouts, and conduits. The pipe sections may be made of any suitable material such as steel, cast iron, wrought iron, sheet material, cement, baked clay, brass and aluminum. In carrying out my invention I provide pipe sections each of which has a female member at one end and a male member at the other end, the female member consisting of an outwardly flanged portion having a cut-out area in the part which is to be placed uppermost or at the top, and the male member having a circumferential flange adapted to be slid through the cut-out area of the female member of and adjacent pipe section. For some purposes I also provide a complemental member adapted to be set into the cut-out area to complete the female member. I preferably provide means for firmly securing together the adjacent ends of the pipe sections after the complemental member has been put in to place. For this purpose the complemental member may be provided with a sprue opening through which sealing material is poured, or a securing strip may be placed between the male and female members of the interfitting ends of adjacent pipe sections.

The full objects and advantages of my invention will appear in connection with the detailed description thereof, and the novel features of my inventive idea will be particularly pointed out in the claims.

In the accompanying drawing, which illustrates some of the forms in which my invention may be embodied,—

Fig. 1 is an elevational view showing the end portions only of two adjacent pipe sections in separated condition. Fig. 2 is a longitudinal sectional view showing the two sections assembled. Fig. 3 is an elevational view of a segmental member. Fig. 4 is a view in cross-section on the line 4—4 of Fig. 6. Fig. 5 is a view taken on the broken line 5—5 of Fig. 4. Fig. 6 is a view in longitudinal section showing a seal which is produced after the coupling has been completely assembled. Fig. 7 is a cross sectional view showing a different shape for the pipe sections, this view corresponding to Fig. 4. Fig. 8 is a fragmentary view showing a modified form of securing device.

As will be understood from the drawing, I provide pipe sections 10, one end of each section being provided with a female coupling portion and the other end being provided with a male coupling portion. The female coupling end is formed with a flanged, outwardly-bulged portion 12 which provides a recess 14 but is cut away at the top, as indicated at 16 for a portion of the circumference and a portion of the width thereof. The male coupling end is provided with a circumferential rib 18 which is adapted to slide down in the space open at the top between the points 16, as will be understood from Figs. 4 and 5, and to be pushed against the annular seat 20 of the female coupling portion, as will be understood from Fig. 2. The segmental member 22 shown detached in Fig. 3 is adapted to be set in to the cut-away space of the female coupling portion. The member 22 carries a flange 24, so that this member complements the flanged, outwardly-bulged portion 12. Furthermore, the member 22 is provided with a sprue opening 26 through which cement or liquid metal such as molten lead or packing of any kind is poured to fill the annular recess 14. The poured material indicated by the numeral 28 in Fig. 6 provides not only a permanent and complete seal, but a means of holding the two adjacent pipe ends against possible separation of the joint by contraction caused by cooling of the pipe sections.

From the preceding description and from the drawing, it is apparent that the female member comprises an outwardly-positioned circumferential flange 12 concentric with the body portion of the pipe section which provides an internal annular seat 20, and that the flange is extended for a portion of its circumference and this extended portion then turned inwardly whereby an arcuate recess 14 is provided which merges into the annular seat, and that the male member has an outwardly-extending circumferential rib 18 adapted to be slid sidewise through the vacant area in the flange extension of an adjacent pipe section and then to be pushed longitudinally into the annular seat 20. Also that the material placed in the recess whether poured or in the form of a flexible strip 30 constitutes means which secures the rib in the annular seat.

The pipe sections shown in Figs. 1 to 6 are cylindrical, but it is obvious that they may be made of different shape. For instance, they may be square in cross-section, as shown in Fig. 7. In this figure the parts corresponding to the parts previously referred to are designated by the same reference characters accompanied by the prime mark. When the pipe sections are to be used for drainage purposes in the manner of drain tile, or irrigation pipe, it is obvious that a seal such as described should not be provided for the joints. In such case the adjacent interfitting ends of the pipe sections may be held together by a securing strip or wire 30 inserted in the recess 14 as shown in Fig. 8, so that space is provided for entrance of water into or delivery from the pipe sections through the joints between the pipe sections.

I claim:

1. In a pipe coupling, a pipe section having a female member at one end and a male member at the other, said female member comprising an outwardly-positioned circumferential flange concentric with the body portion of the pipe section to provide an internal annular seat, said flange being extended for a portion of its circumference and then turned inwardly whereby an arcuate recess is provided which merges into said annular seat, said male member having an outwardly-extending circumferential rib adapted to be slid sidewise through the vacant area in the flange extension of an adjacent pipe section and then to be pushed longitudinally into the annular seat, and means in said recess which secures said rib in said annular seat.

2. In a pipe coupling, a pipe section having a female member at one end and a male member at the other, said female member comprising an outwardly-positioned circumferential flange concentric with the body portion of the pipe section to provide an internal annular seat, said flange being extended for a portion of its circumference and then turned inwardly whereby an arcuate recess is provided which merges into said annular seat, said male member having an outwardly-extending circumferential rib adapted to be slid sidewise through the vacant area in the flange extension of an adjacent pipe section and then to be pushed longitudinally into the annular seat, and sealing material in said recess which secures said rib in said annular seat.

3. In a pipe coupling, a pipe section having a female member at one end and a male member at the other, said female member comprising an outwardly-positioned circumferential flange concentric with the body portion of the pipe section to provide an internal annular seat, said flange being extended for a portion of its circumference and then turned inwardly whereby an arcuate recess is provided which merges into said annular seat, said male member having an outwardly-extending circumferential rib adapted to be slid sidewise through the vacant area in the flange extension of an adjacent pipe section and then to be pushed longitudinally into the annular seat, and a flexible strip in said recess which secures said rib in said annular seat.

4. In a pipe coupling, a pipe section having a female member at one end and a male member at the other end, said female member comprising an outwardly-positioned circumferential flange concentric with the body portion of the pipe section to provide an internal annular seat, said flange being extended for a portion of its circumference and then turned inwardly, whereby an arcuate recess is provided which merges into said annular seat, said male member having an outwardly-extending circumferential rib adapted to be slid sidewise through the vacant area in the flange extension of an adjacent pipe section and then to be pushed longitudinally into the annular seat, and a segmental member adapted to be set into the vacant area to complete the female member, said segmental member containing an opening for pouring joint sealing material into said recess whereby said rib is secured in said annular seat.

In testimony whereof I hereunto affix my signature.

WILLIAM S. LYNESS.